(12) United States Patent
Hendy et al.

(10) Patent No.: US 12,352,851 B1
(45) Date of Patent: Jul. 8, 2025

(54) SENSOR FUSION FOR OBJECT DETECTION

(71) Applicant: Zoox, Inc., Foster City, CA (US)

(72) Inventors: Noureldin Ehab Hendy, Foster City, CA (US); Xiang Gao, Mountain View, CA (US); Li Yon Tan, Foster City, CA (US); Eric Carl Daria Wiener, Foster City, CA (US); Yihang Zhang, San Jose, CA (US)

(73) Assignee: Zoox, Inc., Foster City, CA (US)

( * ) Notice: Subject to any disclaimer, the term of this patent is extended or adjusted under 35 U.S.C. 154(b) by 127 days.

(21) Appl. No.: 18/094,513

(22) Filed: Jan. 9, 2023

(51) Int. Cl.
| | |
|---|---|
| *G01S 13/931* | (2020.01) |
| *B60W 40/02* | (2006.01) |
| *B60W 60/00* | (2020.01) |
| *G01S 7/41* | (2006.01) |
| *G01S 13/86* | (2006.01) |

(52) U.S. Cl.
CPC ........... *G01S 13/931* (2013.01); *B60W 40/02* (2013.01); *B60W 60/001* (2020.02); *G01S 7/41* (2013.01); *G01S 13/865* (2013.01); *B60W 2420/408* (2024.01); *B60W 2554/00* (2020.02); *B60W 2556/40* (2020.02)

(58) Field of Classification Search
CPC ........ G01S 13/931; G01S 7/41; G01S 13/865; B60W 40/02; B60W 60/001; B60W 2420/408; B60W 2554/00; B60W 2556/40
See application file for complete search history.

(56) References Cited

U.S. PATENT DOCUMENTS

2020/0148201 A1\* 5/2020 King .................... G06N 20/00

\* cited by examiner

*Primary Examiner* — Brian P Sweeney
(74) *Attorney, Agent, or Firm* — Lee & Hayes, P.C.

(57) ABSTRACT

Techniques for fusing sensor data generated by different sensor modalities to improve object detections and object predictions determined by low-level systems of a vehicle. The techniques may include determining feature maps based on sensor data generated by different sensor modalities associated with a vehicle. In some examples, the feature maps may include at least a first feature map indicative of a location of an object in an environment of the vehicle and a second feature map indicative of elevation information associated with the object. The techniques may also include inputting the first feature map and the second feature map into a machine-learned model associated with the low-level system of the vehicle. In some examples, an output may be received from the machine-learned model that includes an occupancy grid, and the occupancy grid may exclude representation(s) associated with over-drivable object(s) and/or under-drivable object(s) that may be disposed in the environment.

18 Claims, 5 Drawing Sheets

SENSOR FUSION FOR OBJECT DETECTION

BACKGROUND

Today's vehicles oftentimes include complex systems for controlling vehicle operations. For instance, in addition to including a primary computing system, vehicles can include secondary computing systems and, in some cases, low-level computing systems for performing various functionality. Such secondary and low-level systems, however, may be more constrained than the primary system in terms of computing resources, such as memory, processing, compute, etc. As such, the various functionalities that these systems perform may be limited due to resource constraints, as well as any limitations associated with input data that is provided to these systems.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
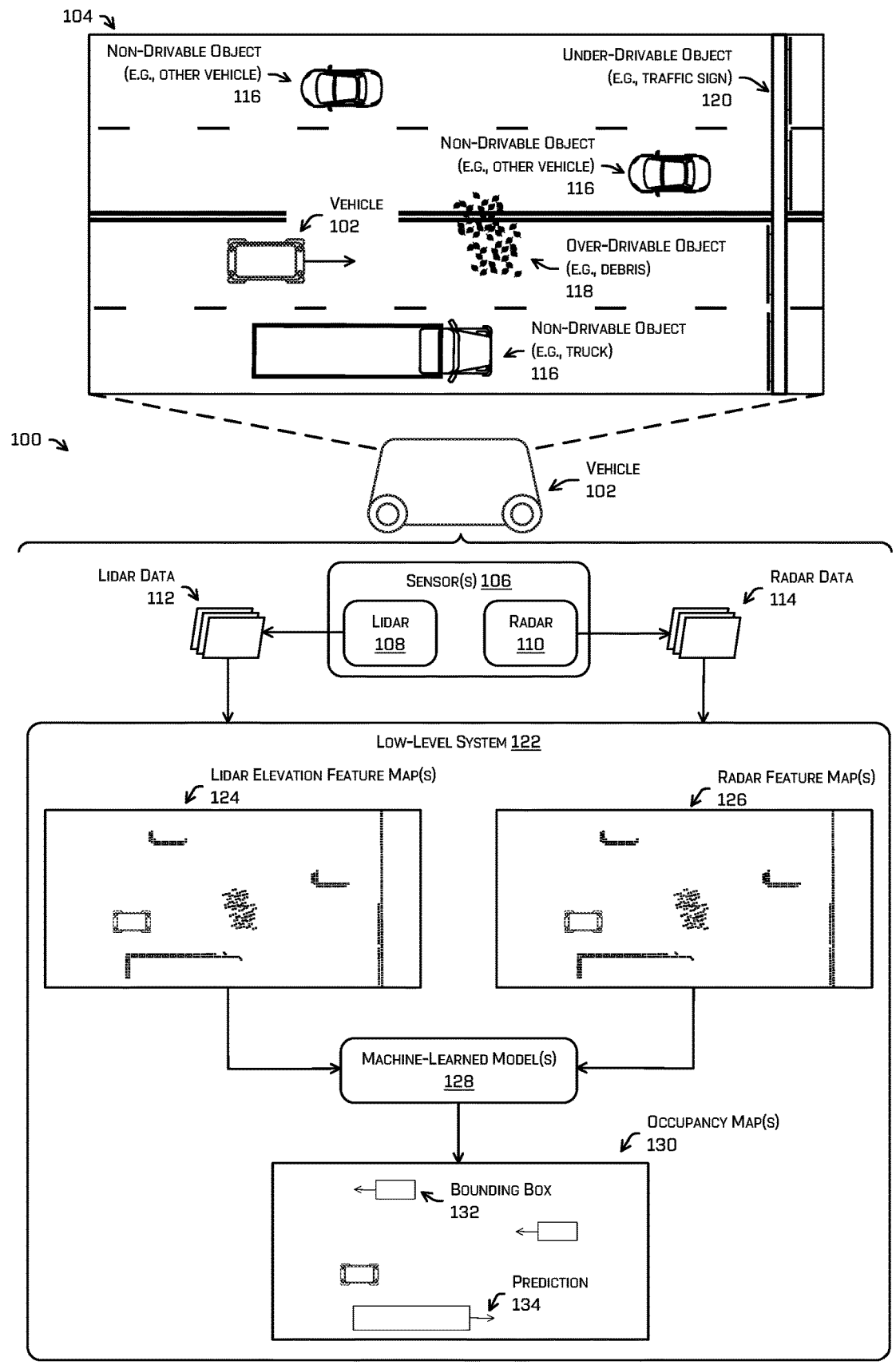
FIG. 1 is a pictorial flow diagram illustrating an example process associated with the technologies disclosed herein for sensor fusion for object detection.

As noted above, secondary and/or low-level vehicle system(s) may be more constrained than primary vehicle system(s) in terms of functionality, computing resources, inputs, outputs, etc. As such, the various functionalities that these systems perform May be limited due to resource constraints, as well as any limitations associated with the input data that is provided to these systems.

For example, a collision avoidance system of a vehicle may be designed to utilize input data from different sensor modalities (e.g., lidar, radar, camera, etc.) in order to predict an occupancy grid to be used for final trajectory validation. However, each different sensor modality has its strengths and its weaknesses in terms of being usable to effectively predict the occupancy grid. For example, while lidar data may be great for accurately predicting object locations and elevations, lidar data can introduce false negatives and/or false positives that may be triggered by rain, steam, exhaust, fog, etc. Similarly, while radar data may be better for predicting object location during inclement weather (e.g., rain, steam, exhaust, fog, etc.), most current radar technologies are not capable of providing elevation measurements, thereby causing numerous false positives on over-drivable objects (e.g., debris, small rodents, etc.) and under-drivable objects (e.g., overhead structures, overhead vegetation (e.g., trees), etc.). Radar systems may also have relatively less resolution than a lidar system and therefore may not be able to determine occupancy to as high of a degree as a corresponding lidar system.

This application is directed to technologies for fusing sensor data generated by different sensor modalities to improve object detections and object predictions determined by a low-level or secondary computing system of a vehicle. To continue the above example, the techniques described herein allow for lidar data to be fused with radar data to determine locations of objects in an environment, while also being able to identify over-drivable and under-drivable objects. For instance, a radar feature map may be fused with a lidar elevation feature map to identify non-drivable objects (e.g., other vehicles, structures, pedestrians, trees, manholes, potholes, embankments, etc.) that the vehicle is to avoid operating within a threshold distance of, as well as to identify over-drivable objects (e.g., objects that the vehicle can safely drive over, such as tree leaves, tumble weeds, garbage, and other debris, as well as steam, fog, snow piles, etc.) and under-drivable objects (e.g., objects that the vehicle can safely drive under, such as traffic signs, traffic lights, overhead structures, light posts, trees, bridges, steam, fog, etc.). In some examples, these feature maps may be input as different channels into a machine-learned model that is configured to output an occupancy grid that includes representations of the non-drivable objects and excludes the over-drivable and under-drivable objects. In some examples, the occupancy grid may be used to validate a planned trajectory of the vehicle (e.g., ensure that the planned trajectory does not overlap with a predicted trajectory and/or location of a non-drivable object).

In some examples, the technologies described herein may be performed in whole or in part by a low-level computing system and/or secondary computing system of a vehicle (e.g., a collision avoidance system, a trajectory validation system, etc.). That is, the technologies of this disclosure may be performed by a vehicle computing system other than a primary computing system of a vehicle that is responsible for controlling operation of the vehicle (e.g., planning vehicle trajectories, etc.). Such a low-level computing system may, in some examples, operate independently of the primary control system to perform checks on the primary system (e.g., to verify that planned trajectories of the vehicle do not overlap trajectories of non-drivable objects or otherwise contribute to adverse events). As such, the low-level computing system may, in some instances, have access to less computing resources (e.g., memory, processing units, etc.) than a high-level or primary computing system.

In some examples, the techniques described herein may be performed by a secondary perception system running on the low-level computing system. The secondary perception system may run on segregated hardware from a primary perception system of a vehicle. For instance, outputs from the primary perception system may be used to plan trajectories for the vehicle to follow, whereas outputs from the secondary perception system may be used to verify whether those planned trajectories will not overlap with a trajectory of another object in an environment of the vehicle or otherwise result in an adverse event. In some examples, the secondary perception system may operate on more robust/hardened hardware (e.g., using ICs that are qualified to operate at higher temperature/vibration environments). Such hardware may, in some instances, be less complex and therefore provide less compute than the hardware that the primary perception system runs on.

By way of example, and not limitation, a method according to the technologies described herein may include receiving sensor data from different sensor modalities associated with a vehicle. For instance, the sensor data may include first sensor data generated by a first sensor modality associated with the vehicle, second sensor data generated by a second sensor modality associated with the vehicle, and so forth. In some examples, the different sensor modalities may include lidar sensors, radar sensors, image sensors, and the like. As such, the sensor data may include radar data generated by a radar sensor and lidar data generated by a lidar sensor. In some examples, the sensor data may include multiple frames of sensor data. For instance, N previous frames of lidar data and radar data may be received, where N represents any integer number. As an example, in addition to a current or present frame of radar data and lidar data, 4 additional, previous frames of radar data and lidar data, each, may be received, with each frame being 0.5 seconds apart.

In some examples, a first feature map may be determined based on first sensor data generated by a first sensor modality associated with the vehicle. The first feature map may, in some examples, be indicative of a location of an object in an environment of the vehicle. In some examples, the first feature map may be a radar feature map generated based on the radar data. In some examples, the first feature map may be a top-down feature map (e.g., a feature map in which the features are presented as seen from a top-down or birds-eye perspective). In some examples, the first feature map may include one or more observations associated with objects in the environment. For instance, if the first feature map is a radar feature map, the radar feature map may include radar observations associated with object in the environment. In some examples, the various features included in the radar feature map may include one or more of (i) (x,y) location features (e.g., which may show the 2-dimensional location of a radar observation); (ii) radar cross section features (e.g., which may show how strong a radar observation/measurement is); (iii) signal-to-noise ratio features (e.g., which may show the quality of a radar observation/measurement); and/or (iv) doppler measurement features (e.g., which may show the relative speed of an object to the host vehicle in the direction of arrival). In some examples, the doppler measurement features may be an important feature of radar as the direct measurement of speed can be useful in predicting the location of objects.

In some examples, a second feature map may be determined based on second sensor data generated by a second sensor modality associated with the vehicle. In some examples, the second feature map may be indicative of elevation information associated with the object. In some examples, the second feature map may be a lidar feature map generated based on the lidar data. In some examples, the second feature map may be a top-down feature map similar to the first feature map such that observations included in the second feature map "overlap" with observations of the first feature map. For instance, if a first observation associated with an object is included in the first feature map, a second observation associated with the object should be included in the second feature map at a similar or the same location. In some examples, if the second feature map is a lidar feature map, the lidar feature map may include lidar observations associated with object in the environment. In some examples, the lidar observations may be indicative of elevation information associated with the observation/object. In some examples, the various features included in the lidar feature map may include one or more of (i) (x, y, x) location features (e.g., which may show the 3-dimensional location of a lidar observation point); and/or (ii) lidar intensity features (e.g., which may show how strong a lidar observation point is). In some examples, the lidar intensity features may be a good indicator of whether a lidar observation point is reflected from fog, steam, exhaust, or the like.

In some examples, multiple feature maps indicative of elevation information may be determined. For instance, based on a lidar sensor scan, multiple lidar feature maps may be determined for different elevation "slices" (e.g., layers, zones, containers, etc.) in the environment. For instance, a feature map may be determined for a first elevation slice from 0-0.5 meters above ground level (AGL), a second feature map may be determined for a second elevation slice from 0.5-1.0 meters AGL, a third feature map may be determined for a third elevation slice from 1.0-1.5 meters AGL, a fourth feature map may be determined for a fourth elevation slice from 1.5-2.0 meters AGL, and so forth until a target elevation is reached (e.g., 4.0 meters). In some examples, each individual feature map for each different elevation slice may indicate the elevation of the observations included in the elevation slice.

In some examples, one or multiple additional feature maps may further be determined based on the sensor data. For instance, feature maps may be determined for image data. Additionally, feature maps may be determined for lidar data and/or radar data in addition to the feature maps described above. In some examples, feature maps may be determined for a period of time leading up to a current time. For instance, feature maps may be determined for a previous 2.5 seconds or similar, with a feature map at every 0.5 second interval (e.g., first feature map(s) for 0 seconds (present time), second feature map(s) for −0.5 seconds, third feature map(s) for −1.0 seconds, and so forth).

In some examples, the different feature maps and/or time series of feature maps may be input into a machine-learned model. In some instances, the machine-learned model may be associated with a low-level system of the vehicle (e.g., a collision avoidance system, a trajectory validation system, a secondary perception system, etc.). As used herein, a "low-level system" means a system (e.g., computing system) that has access to less resources (e.g., computing resources) than a primary system of the vehicle that is responsible for controlling primary operation of the vehicle (e.g., proposing and planning trajectories, predicting object movements, controlling speed, acceleration, deceleration, etc. of the vehicle, and the like), but otherwise runs concurrently with the primary or high-level systems.

In some examples, the machine-learned model may be trained or otherwise configured to predict locations of non-drivable objects in the environment, trajectories of the non-drivable objects, velocities of the non-drivable objects, sizes of the non-drivable objects, as well as identify over-drivable and under-drivable objects, based at least in part on the input feature map(s). For instance, the machine-learned model may determine the location, size, position, orientation, trajectory, etc. of an object based on a radar feature map, lidar feature map, image data feature map, etc. Additionally, the machine-learned model may determine whether that object is a non-drivable object, an over-drivable object, or an under-drivable object based at least in part on an elevation-indicative feature map (e.g., the lidar feature map or other sensor data feature map that is indicative of elevation measurements associated with the object or other observation points). That is, the machine-learned model may determine whether an object is an over-drivable or under-drivable object based at least in part on its elevation observations. For instance, the machine-learned model may determine an over-drivable object or an under-drivable object based at least in part on values of the elevation measurements being outside of a range of elevation values. In other words, if the elevation measurements associated with the object are low elevation measurements (e.g., object is less than 0.1 meters tall) or high elevation measurements (e.g., bottom of object is 4 meters AGL), then the machine-learned model may classify the objects as over-drivable or under-drivable. As another example, if the elevation measurements fall inside of a certain lidar slice (e.g., measurements only in slice from 0-0.5 meters or only in slices above 3.0 meters) then the machine-learned model may classify the object as over-drivable or under-drivable.

In some examples, an output may be received from the machine-learned model based on the input feature maps and/or other input data. In some examples, the output may include an occupancy grid associated with the environment surrounding the vehicle. In some examples, the occupancy grid may indicate locations of non-drivable objects in the environment, predicted trajectories of the non-drivable objects, predicted velocities of the non-drivable objects, and the like. Further, in some examples, the occupancy grid may exclude from presenting locations of over-drivable objects and/or under-drivable objects that is/are disposed in the environment. For instance, the occupancy grid may exclude from presenting a location of an overhead traffic sign that the vehicle can safely drive below or exclude from presenting a location of a pile of leaves or other debris that the vehicle can safely drive over/through.

In some examples, the output from the machine-learned model may include multiple occupancy grids indicative of predicted current and future locations, trajectories, velocities, etc. associated with the non-drivable objects in the environment. For instance, the output may include occupancy grids for a current and future period of time, with different occupancy grids for different intervals during the period of time. As an example, an output may include a first occupancy grid for time 0 seconds (e.g., present time), a second occupancy grid for time+0.5 seconds, a third occupancy grid from time+1.0 seconds, and so forth. In this way, the output may be indicative of predicted future locations of the non-drivable objects.

In some examples, a planned trajectory of the vehicle may be validated and/or altered based at least in part on the output occupancy grid. For instance, if the planned trajectory of the vehicle overlaps a predicted location and/or trajectory of a non-drivable object, then the planned trajectory for the vehicle may be altered, or another corrective action may be taken. In some examples, altering the planned trajectory may include signaling to a high-level system of the vehicle (e.g., a planner component) that the trajectory overlaps and needs to be altered. In some examples, the trajectory may be validated if the planned trajectory does not overlap a predicted trajectory, location, etc. of a non-drivable object.

The technologies described herein improve the functioning of vehicles in a number of ways. For example, by improving the detectability of non-drivable objects versus over-drivable and under-drivable objects for low-level vehicle systems, the low-level system can refrain from invoking a high-level system to perform trajectory re-evaluation. That is, because the low-level system can make more accurate object predictions and detections according to the techniques described herein, the low-level system can invoke the high-level systems of the vehicle less frequently, thereby preserving computing resources of the high-level systems for performing other tasks. As an example, if a secondary perception system detects a presence of a non-drivable object that the primary perception system missed, the low-level systems may act to stop the vehicle to avoid an adverse event, pull the vehicle over to the side of the road, etc. without invoking the high-level systems. Additionally, the techniques described herein reduce false-positives and false-negatives by being able to detect over-drivable and under-drivable objects. This allows the vehicle to operate more similarly to how a human operated vehicle would operate (e.g., by not stopping or swerving for an overhead traffic sign, a manhole cover, leaves and other debris, etc.

Furthermore, the techniques described herein improve the safety of autonomous vehicles by providing an intelligent evaluation of a planned vehicle trajectory without necessarily invoking the high-level system. This allows for reassurance that a planned trajectory of a vehicle will not overlap a predicted trajectory or a predicted location of another object in the environment, thereby avoiding collisions and other adverse events. Furthermore, by preventing unwanted vehicle behavior (e.g., swerving or stopping for false-positive objects that the vehicle can operate under/over), this decreases the chances of causing other vehicles to react adversely based on the vehicle's behavior (e.g., other vehicles swerving or failing to stop in reaction to sudden, unnatural braking of the vehicle, other vehicles swerving to avoid erratic swerving of the vehicle because of false-positive overhead traffic signs, etc.). These and other improvements will be readily apparent to those having ordinary skill in the art.

These and other aspects of the disclosed technologies are described further below with reference to the accompanying drawings. The drawings are merely example implementations and should not be construed to limit the scope of the claims. For example, while the example vehicles are shown and described as being autonomous vehicles that are capable of navigating between locations without human control or intervention, techniques described herein are also applicable to non-autonomous and/or semi-autonomous vehicles. Also, while the vehicle is illustrated as having a coach style body module with seats facing one another toward a center of the vehicle, other body modules are contemplated. Body modules configured to accommodate any number of one or more occupants (e.g., 1, 2, 3, 4, 5, 6, 7, 8, etc.) are contemplated. Additionally, while the example body modules shown include a passenger compartment, in other examples the body module may not have a passenger compartment (e.g., in the case of a cargo vehicle, delivery vehicle, construction vehicle, etc.).

FIG. 1 is a pictorial flow diagram illustrating an example process 100 associated with the technologies disclosed herein for sensor fusion for object detection. In examples, the vehicle 102 may include one or more components or systems that enable the vehicle 102 to traverse the environment 104. For instance, the vehicle 102 may include one or more sensor(s) 106 that generate sensor data associated with the environment 104. For example, the vehicle may include audio sensors (e.g., microphones), image sensors (e.g., cameras), lidar sensors 108, radar sensors 110, ultrasonic transducers, sonar sensors, location sensors (e.g., global positioning component (GPS), compass, etc.), inertial sensors (e.g., inertial measurement units, accelerometers, magnetometers, gyroscopes, etc.), wheel encoders, environmental sensors (e.g., temperature sensors, humidity sensors, light sensors, pressure sensors, smoke sensors, etc.), time of flight (ToF) sensors, etc. In examples, the type(s) of sensor data generated by the sensor(s) 106 may include audio data, image data, lidar data 112, radar data 114, ultrasonic transducer data, sonar data, location data (e.g., global positioning component (GPS), compass, etc.), pose data, inertial data (e.g., inertial measurement units data, accelerometer data, magnetometer data, gyroscope data, etc.), wheel encoder data, environmental data (e.g., temperature sensor data, humidity sensor data, light sensor data, pressure sensor data, smoke sensor data, etc.), ToF sensor data, etc.

In various examples, the environment 104 may include different type of objects. For instance, the environment 104 may include other vehicles, trucks, pedestrians, cyclists, animals, structures, debris, traffic signs, trees and other vegetation, and/or the like. According to the technologies disclosed herein, these objects and, in some instances, portions of these objects can be classified as non-drivable objects, under-drivable objects, and over-drivable objects. In the example environment 104 shown in FIG. 1, the environment 104 includes non-drivable objects 116, such as the other vehicles and the truck, an over-drivable object 118, such as the debris (e.g., leaves), and an under-drivable object 120 (e.g., a traffic sign).

In some examples, the sensor data, such as the lidar data 112 and the radar data 114, may be indicative of the respective locations of the objects in the environment 104. For instance, the radar data 110 may be indicative of the locations of the objects in relation to the vehicle 102 and/or the environment 104. That is, the radar data 110 may, in some examples, be indicative of the horizontal distances between the vehicle 102 and the objects. In some examples, the lidar data 112 may be indicative of elevation measurements associated with the objects in the environment 104.

The vehicle 102 may also include a low-level system 122. The low-level system 122 may be a computing system or other system that has access to less resources (e.g., computing resources) than a primary, or high-level, system of the vehicle 102 that is responsible for controlling primary operation of the vehicle 102 (e.g., proposing and planning trajectories, predicting object movements, controlling speed, acceleration, deceleration, etc. of the vehicle, and the like). In some examples, the lidar data 112 and the radar data 114 (as well as other sensor data) may be received by the low-level system 122. In some examples, the lidar data 112 and the radar data 114 may include multiple frames. For instance, the lidar data 112 and the radar data 114 may include N previous frames of lidar data 112 and radar data 114, where N represents any number. As an example, in addition to a current or present frame of radar data 114 and lidar data 112, additional, previous frames of radar data 114 and lidar data 112 may be received, with each frame being 0.5 seconds apart. As an example, a first frame of lidar data 112 may be received that is associated with a present time in the environment 104 (e.g., time 0), a second frame of lidar data 112 may be received that is associated with a past time in the environment 104 (e.g., time −0.5 seconds), a third frame of lidar data 112 may be received that is associated with another past time in the environment 104 (e.g., time −1.0 seconds), and so forth. In examples, the same may be received for the radar data 114.

In some examples, the low-level system 122 may determine one or more lidar elevation feature map(s) 124 associated with the environment 104 based at least in part on the lidar data 112. In examples, the lidar elevation feature map(s) 124 may be indicative of elevation information associated with the objects in the environment 104. In some examples, the lidar elevation feature map(s) 124 may be top-down feature maps (e.g., representing the environment 104 from a top-down or "birds-eye" perspective. In some examples, rather than determining the lidar elevation feature map(s) 124, the low-level system 122 may be provided the lidar elevation feature map(s) 124 by another component of the vehicle 102 (e.g., a higher-level component).

In some examples, the low-level system 122 may also determine one or more radar feature map(s) 126 associated with the environment 104 based at least in part on the radar data 114. In examples, the radar feature map(s) 126 may include one or more observations associated with objects in the environment 104 and be represented from a top-down perspective. Because both of the lidar elevation feature map(s) 124 and the radar feature map(s) 126 are from the top-down perspective, the observations from one feature map may "overlap" with observations from another feature map. For instance, if a first observation associated with an object is included in the radar feature map 126, a second observation associated with the object should be included in the lidar elevation feature map(s) 124 at a similar or the same location, and this can indicate an elevation of the object at that precise point in the environment/feature map. In some examples, rather than determining the radar feature map(s) 126, the low-level system 122 may be provided the radar feature map(s) 126 by another component of the vehicle 102 (e.g., a higher-level component).

In some examples, the lidar elevation feature map(s) 124 may include a different feature map for different elevation "slices" (e.g., layers, zones, containers, etc.). For instance, a first lidar elevation feature map 124 may be determined for a first elevation slice from 0-0.5 meters above ground level (AGL) of the environment 104, a second lidar elevation feature map 124 may be determined for a second elevation slice from 0.5-1.0 meters AGL in the environment 104, a third lidar elevation feature map 124 may be determined for a third elevation slice from 1.0-1.5 meters AGL of the environment 104, and so forth until a target elevation is reached (e.g., 4.0 meters). In some examples, each individual feature map for each different elevation slice may indicate maximum elevations for the observations included in the elevation slice.

In some examples, one or multiple additional feature maps may further be determined by the low-level system 122 based on the sensor data. For instance, feature maps may be determined for image data. Additionally, feature maps may be determined for the lidar data 112 and/or the radar data 114 in addition to the feature maps 124 and 126. In some examples, feature maps may be determined for a period of time leading up to a current time. For instance, the lidar elevation feature map(s) 124, the radar feature map(s) 126, and other feature maps may be determined for a previous 2.5 seconds or similar, with a feature map at every 0.5 second interval (e.g., first feature map(s) for 0 seconds (present time), second feature map(s) for −0.5 seconds, third feature map(s) for −1.0 seconds, and so forth).

In some examples, the lidar elevation feature map(s) 124 and the radar feature map(s) 126, as well as any additional feature maps, may be input into one or more machine-learned model(s) 128. In some instances, the machine-learned model(s) 128 may be trained or otherwise configured to predict locations of the non-drivable objects 116 in the environment 104, trajectories of the non-drivable objects 116, velocities of the non-drivable objects 116, sizes of the non-drivable objects 116, as well as identify over-drivable and under-drivable objects 118 and 120, based at least in part on the input feature map(s). For instance, the machine-learned model(s) 128 may determine the location, size, position, orientation, trajectory, etc. of an object based on the radar feature map(s) 126, the lidar elevation feature map(s) 124, image data feature map(s), etc. Additionally, the machine-learned model(s) 128 may determine whether that object is a non-drivable object 116, an over-drivable object 118, or an under-drivable object 120 based at least in part on the lidar elevation feature map(s) 124. That is, the machine-learned model(s) 128 may determine whether an object is an over-drivable object 118 or under-drivable object 120 based at least in part on its elevation observations. For instance, the machine-learned model(s) 128 may determine an over-drivable object 118 or an under-drivable object 120 based at least in part on values of the elevation measurements being outside of a range of elevation values. In other words, if the elevation measurements associated with the object are low elevation measurements (e.g., object is less than 0.1 meters tall) or high elevation measurements (e.g., bottom of object is 4 meters AGL), then the machine-learned model(s) may classify the objects as over-drivable objects 118 or under-drivable objects 120. As another example, if the elevation measurements fall inside of a certain lidar slice (e.g., measurements only in slice from 0-0.5 meters or only in slices above 3.0 meters) then the machine-learned model(s) 128 may classify the object as over-drivable or under-drivable.

In some examples, the machine-learned model(s) 128 may determine, as an output, one or more occupancy map(s) 130 (also referred to as occupancy grids) associated with the environment 104 surrounding the vehicle 102. In some examples, the occupancy map(s) 130 may indicate locations of non-drivable objects 116 in the environment 104 by including a bounding box 132 bounding a region occupied by the non-drivable object. Additionally, in some examples, the occupancy map(s) 130 may indicate predictions 134 associated with the objects, such as a predicted trajectory, predicted velocities, and the like. Further, in some examples, the occupancy map(s) 130 may exclude from presenting locations of over-drivable objects 118 and/or under-drivable objects 120 that is/are disposed in the environment 104. For instance, the machine-learned model(s) 128 may exclude bounding boxes associated with overhead traffic signs, light posts, debris, etc. from being included in the occupancy map(s) 130.

In some examples, the occupancy map(s) 130 may include multiple occupancy map(s) 130 for a current and future period of time, with different occupancy maps for different intervals during the period of time. As an example, an output may include a first occupancy map for time 0 seconds (e.g., present time), a second occupancy map for time +0.5 seconds, a third occupancy map from time+1.0 seconds, and so forth. In this way, the output may be indicative of predicted future locations of the non-drivable objects.

In some examples, a planned trajectory of the vehicle 102 may be validated and/or altered based at least in part on the output occupancy map(s) 130. For instance, if the planned trajectory of the vehicle 102 overlaps a predicted location and/or trajectory of a non-drivable object 116, then the planned trajectory for the vehicle 102 may be altered. In some examples, altering the planned trajectory may include signaling to a high-level system of the vehicle 102 (e.g., a planner component) that the trajectory overlaps and needs to be altered. In some examples, the trajectory may be validated or otherwise confirmed as safe if the planned trajectory does not overlap a predicted trajectory, location, etc. of a non-drivable object 116.

Figure 2:
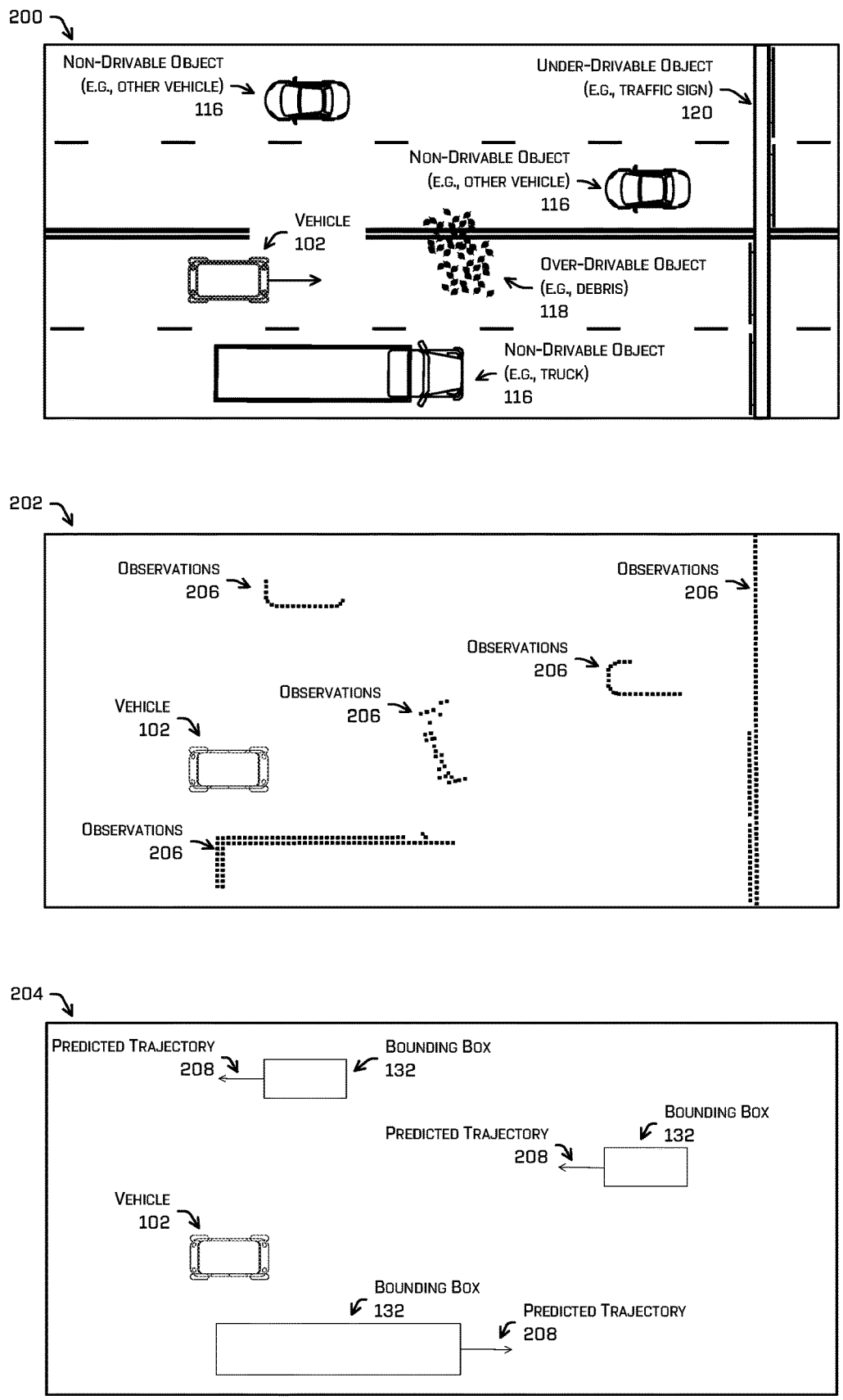
FIG. 2 illustrates an example top-down scene, an example feature map, and an example occupancy grid associated with the technologies disclosed herein.

FIG. 2 illustrates an example top-down scene 200, an example feature map 202, and an example occupancy map 204 associated with the technologies disclosed herein. The top-down scene 200 is a scene of an example that includes different type of objects. For instance, the environment shown in the top-down scene 200 includes non-drivable objects 116, such as the other vehicles and the truck, an over-drivable object 118, such as the debris (e.g., leaves), and an under-drivable object 120 (e.g., an overhead traffic sign). The vehicle 102 may safely drive over the over-drivable object 118 and safely drive under the under-drivable object 120, but the vehicle 102 should not overlap with the non-drivable objects 116.

The feature map 202 includes multiple observations 206 associated with the non-drivable objects 116, the over-drivable object 118, and the under-drivable object 120, as shown in FIG. 2. In some examples, these observations 206 may be radar observations, lidar observations, image data observations, and/or the like. For instance, the observations 206, in the context of lidar observations, indicate a point in space where a lidar return was recorded (e.g., a point in space where a lidar sensor beam reflected off a target object). As such, the observations 206 may be more focused on surfaces that reflected the sensor beam, such as the surfaces of the objects that are facing toward the vehicle 102 as opposed to the surfaces of the objects that are facing away from the vehicle 102.

The occupancy map 204 includes bounding boxes 132 associated with the non-drivable objects 116, as well as predicted trajectories 208 associated with the non-drivable objects 116. Additionally, the occupancy map 204 excludes any references to the over-drivable object 118 and the under-drivable object 120, as those objects should not affect the behavior of the vehicle 102 because the vehicle 102 can safely drive over and under those objects.

Figure 3:
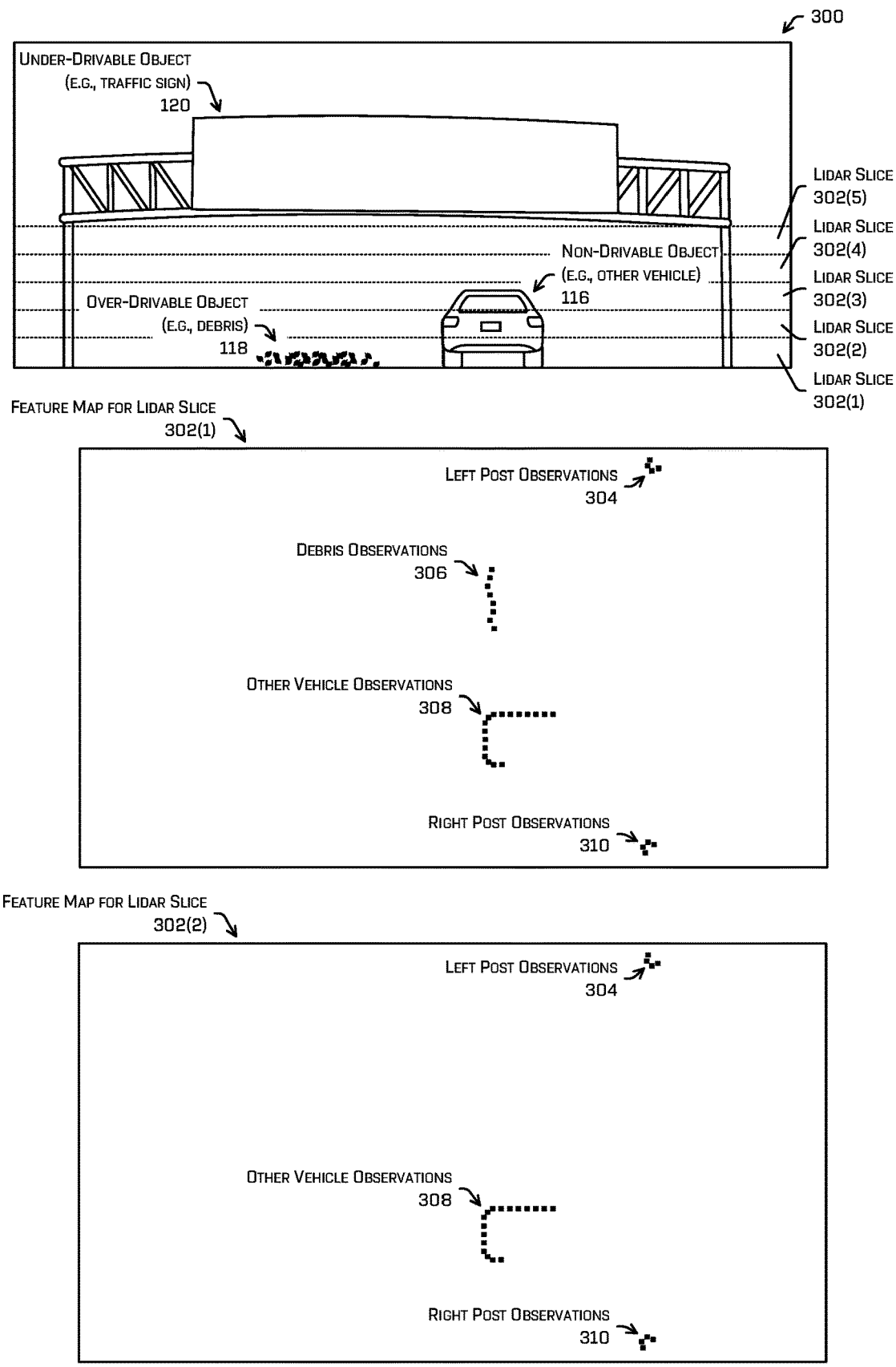
FIG. 3 illustrates an example scene of an environment including various classifications of objects, as well as example lidar slices associated with the example scene.

FIG. 3 illustrates an example scene of an environment 300 including various classifications of objects, as well as example lidar slices 302(1)-302(5) associated with the example scene. In some examples, based on a lidar sensor scan, multiple different feature maps may be determined for different lidar slices 302(1)-302(5). For instance, a feature map for the lidar slice 302(1) may be determined for the first lidar slice 302(1), a second feature map for the lidar slice 302(2) may be determined for the lidar slice 302(2), and so forth until a target elevation is reached (e.g., at lidar slice 302(5)). In some examples, the height of each lidar slice 302 may be a fixed height (e.g., 0.5 meters, 1 meter, 1 foot, 2 feet, etc.). In some examples, each individual feature map for each different lidar slice 302 may indicate the elevation of the observations included in the elevation slice.

In the feature map for the lidar slice 302(1) various observations are included for the objects that are present in that slice. For instance, left post observations 304 and right post observations 310 are included that correspond with the upright posts of the traffic sign, debris observations 306 are included that correspond with the debris, and other vehicle observations 308 are included that correspond with the other vehicle.

In the feature map for the lidar slice 302(2) similar observations are included for the objects present in the scene, but the debris observations 306 are left out because the elevation of the debris does not extend into the lidar slice 302(2). However, the left post observations 304 and right post observations 310 are included in the feature map for lidar slice 302(2), as well as the other vehicle observations 308 because these objects have observable features within the lidar slice 302(2).

Figure 4:
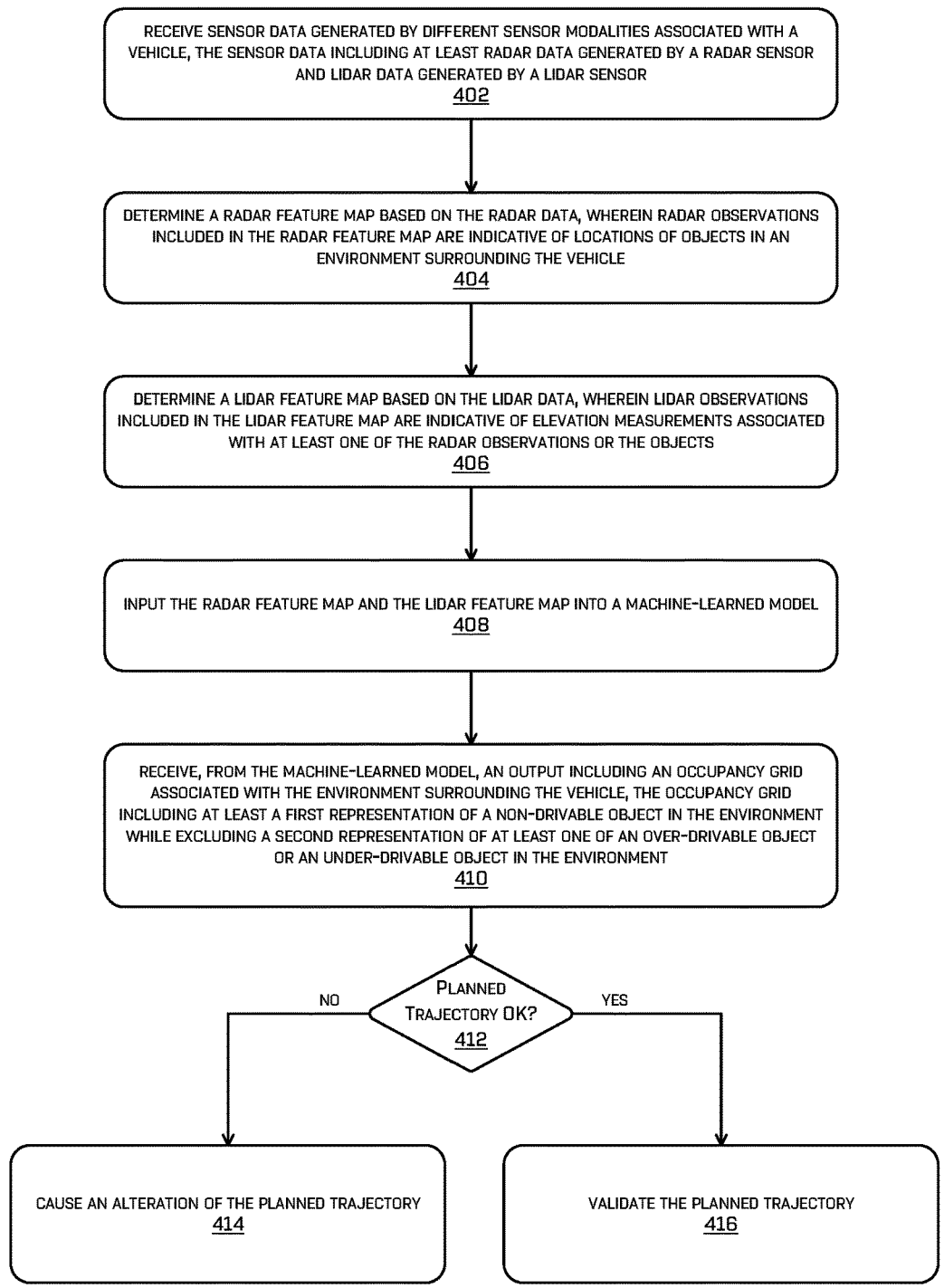
FIG. 4 is a flowchart illustrating an example process associated with the sensor fusion and object detection technologies disclosed herein.

FIG. 4 is a flowchart illustrating an example process 400 associated with the sensor fusion and object detection technologies disclosed herein. The method illustrated in FIG. 4 may be described with reference to one or more of the vehicles, teleoperations systems, and user interfaces described in FIGS. 1-3 for convenience and ease of understanding. However, the process illustrated in FIG. 4 is not limited to being performed using the vehicles, teleoperations systems, and user interfaces described in FIGS. 1-3, and may be implemented using any of the other vehicles, teleoperations systems, and user interfaces described in this application, as well as vehicles, teleoperations systems, and user interfaces other than those described herein. Moreover, the vehicles, teleoperations systems, and user interfaces described herein are not limited to performing the method illustrated in FIG. 4.

The process 400 is illustrated as a collection of blocks in a logical flow graph, which represents a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process may be omitted entirely. Moreover, the process 400 may be combined in whole or in part with other methods.

The process 400 begins at operation 402, which includes receiving sensor data generated by different sensor modalities associated with a vehicle, the sensor data including at least radar data generated by a radar sensor and lidar data generated by a lidar sensor. For instance, the low-level system 122 may receive the sensor data generated by the different sensor modalities associated with the vehicle 102, such as the lidar data 112 generated by the lidar sensor 108 and the radar data 114 generated by the radar sensor 110.

At operation 404, the process 400 includes determining a radar feature map based on the radar data, wherein radar observations included in the radar feature map are indicative of locations of objects in an environment surrounding the vehicle. For instance, the low-level system 122 may determine the radar feature map(s) 126 based on the radar data 114. In some examples, the radar observations 206 included in the radar feature map(s) 126 may be indicative of location of objects in the environment 104 surrounding the vehicle 102.

At operation 406, the process 400 includes determining a lidar feature map based on the lidar data, wherein lidar observations included in the lidar feature map are indicative of elevation measurements associated with at least one of the radar observations or the objects. For example, the low-level system 122 may determine the lidar elevation feature map(s) 124 based on the lidar data 112. In some examples, the lidar observations 206 may be indicative of elevation measurements associated with the radar observations in the radar feature map(s) 126 or the objects.

At operation 408, the process 400 includes inputting the radar feature map and the lidar feature map into a machine-learned model. For instance, the low-level system 122 may input the radar feature map(s) 126 and the lidar elevation feature map(s) 124 into the machine-learned model(s) 128.

At operation 410, the process 400 includes receiving, from the machine-learned model, an output including an occupancy grid associated with the environment surrounding the vehicle. For example, the low-level system 122 may receive the output occupancy map(s) 130 from the machine-learned model(s) 128. In some examples, the occupancy map(s) 130 may indicate locations of non-drivable objects in the environment while excluding a locations of at least one of an over-drivable object or an under-drivable object.

At operation 412, the process 400 includes determining whether a planned trajectory of the vehicle will result in an adverse event based at least in part on the occupancy grid. For instance, the low-level system 122 may determine whether the planned trajectory of the vehicle 102 will result in the adverse event based at least in part on the occupancy map(s) 130. That is, the low-level system 122 may determine whether the planned trajectory overlaps a predicted location or trajectory of a non-drivable object in the environment 104. If the planned trajectory is not acceptable, the process 400 proceeds to operation 414. If the planned trajectory is acceptable (e.g., will not overlap), the process 400 proceeds to operation 416.

At operation 414, the process 400 includes causing an alteration of the planned trajectory. For instance, the low-level system 122 may cause an alteration of the planned trajectory of the vehicle 102. In some examples, the low-level system 122 may invoke a high-level system of the vehicle 102, such as a planner component, to alter the trajectory.

At operation 416, the process 400 includes validating the planned trajectory. For instance, the low-level system 122 may validate the planned trajectory of the vehicle 102. For instance, the low-level system 122 may refrain from invoking the planner component or another high-level system of the vehicle 102 because the planned trajectory does not overlap or otherwise result in an adverse event.

Figure 5:
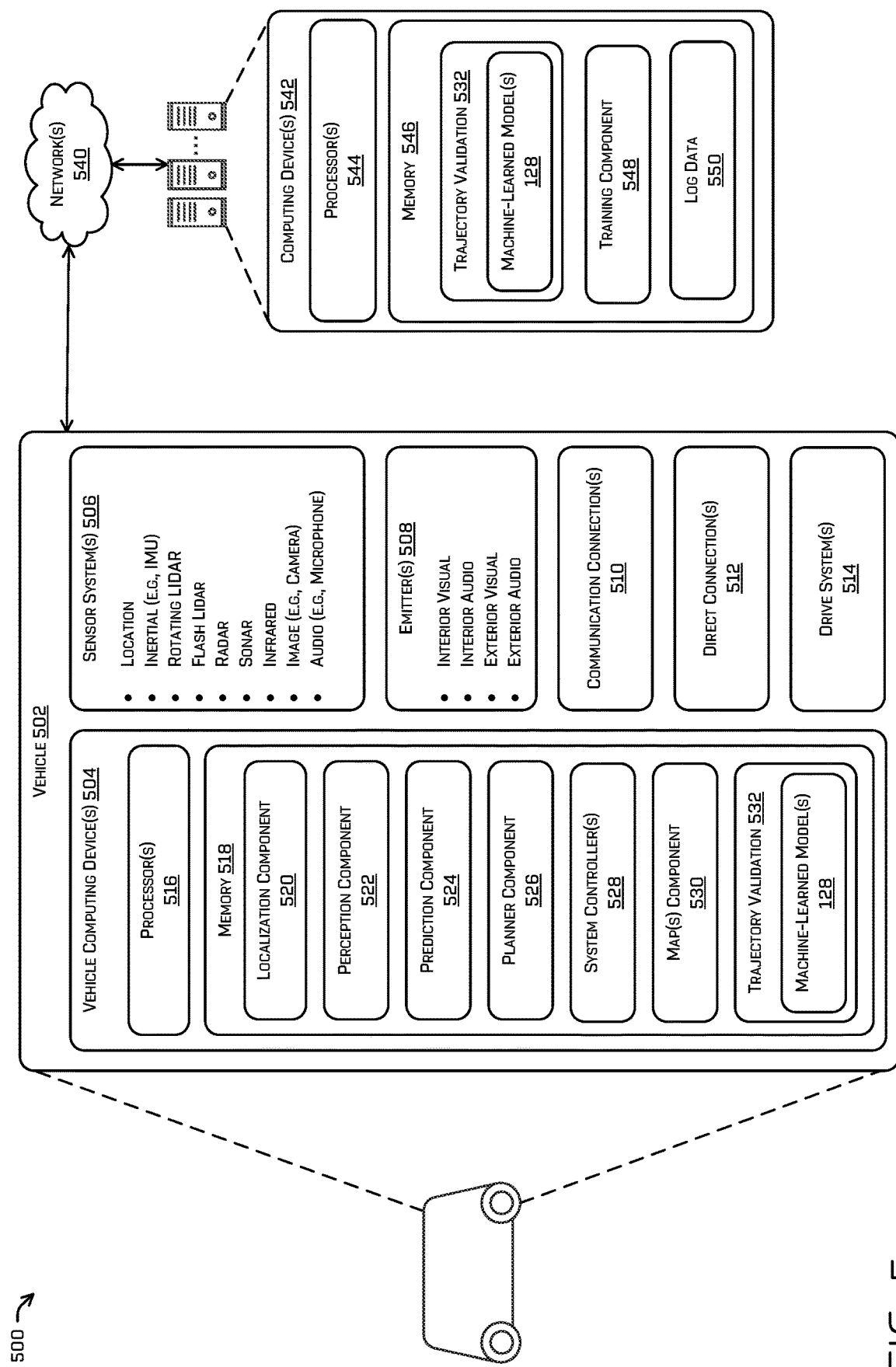
FIG. 5 is a block diagram illustrating an example system that may be used for performing aspects of the techniques described herein.

FIG. 5 is a block diagram illustrating an example system that may be used for performing aspects of the techniques described herein. In some examples, the system 500 may include one or multiple features, components, and/or functionality of examples described herein with reference to other figures, such as FIGS. 1-4.

The system 500 may include a vehicle 502. In some examples, the vehicle 502 may include some or all of the features, components, and/or functionality described above with respect to vehicle 102. For instance, the vehicle 502 may comprise a bidirectional vehicle. As shown in FIG. 5, the vehicle 502 may also include a vehicle computing device(s) 504, one or more sensor systems 506, one or more emitters 508, one or more communication connections 510, one or more direct connections 512, and/or one or more drive assemblies 514.

The vehicle computing device(s) 504 can, in some examples, include one or more processor(s) 516 and memory 518 communicatively coupled with the one or more processor(s) 516. In the illustrated example, the vehicle 502 is an autonomous vehicle; however, the vehicle 502 could be any other type of vehicle (e.g., automobile, truck, bus, aircraft, watercraft, train, etc.), or any other system having components such as those illustrated in FIG. 5 (e.g., a robotic system, an automated assembly/manufacturing system, etc.). In examples, the one or more processor(s) 516 may execute instructions stored in the memory 518 to perform one or more operations on behalf of the one or more vehicle computing device(s) 504.

The memory 518 of the one or more vehicle computing device(s) 504 stores a localization component 520, a perception component 522, a prediction component 524, a planner component 526, one or more system controller(s) 528, a map(s) component 530, and a trajectory validation component 532. Though depicted in FIG. 5 as residing in memory 518 for illustrative purposes, it is contemplated that the localization component 520, perception component 522, prediction component 524, planner component 526, one or more system controller(s) 528, map(s) component 530, and/or the trajectory validation component 532, can additionally, or alternatively, be accessible to the vehicle 502 (e.g., stored on, or otherwise accessible from, memory remote from the vehicle 502, such as memory 546 of one or more computing device(s) 542).

In at least one example, the localization component 520 can include functionality to receive data from the sensor system(s) 506 to determine a position and/or orientation of the vehicle 502 (e.g., one or more of an x-, y-, z-position, roll, pitch, or yaw). For example, the localization component 520 can include and/or request/receive a map of an environment and can continuously determine a location and/or orientation of the autonomous vehicle within the map. In some instances, the localization component 520 can utilize SLAM (simultaneous localization and mapping), CLAMS (calibration, localization and mapping, simultaneously), relative SLAM, bundle adjustment, non-linear least squares optimization, or the like based on image data, lidar data, radar data, IMU data, GPS data, wheel encoder data, and the like captured by the one or more sensor systems 506 or received from one or more other devices (e.g., computing devices 542) to accurately determine a location of the autonomous vehicle. In some instances, the localization component 520 can provide data to various components of the vehicle 502 to determine an initial position of the autonomous vehicle for generating a trajectory and/or for determining to retrieve map data.

In some instances, the perception component 522 can include functionality to perform object tracking, detection, segmentation, and/or classification. In some examples, the perception component 522 can provide processed sensor data that indicates a presence of an entity that is proximate to the vehicle 502 and/or a classification of the entity as an entity type (e.g., car, pedestrian, cyclist, animal, building, tree, road surface, curb, sidewalk, unknown, etc.). In additional and/or alternative examples, the perception component 522 can provide processed sensor data that indicates one or more characteristics associated with a detected entity (e.g., a tracked object) and/or the environment in which the entity is positioned. In some examples, characteristics associated with an entity can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

The prediction component 524 can receive sensor data from the sensor system(s) 506, map data, and/or perception data output from the perception component 522 (e.g., processed sensor data) and can output predictions associated with one or more objects within the environment of the vehicle 502. Predictions can include predicted trajectories associated with objects in the environment in which the vehicle 502 is operating.

In general, the planner component 526 can determine a path for the vehicle 502 to follow to traverse through an environment. For example, the planner component 526 can determine various routes and trajectories and various levels of detail. For example, the planner component 526 can determine a route to travel from a first location (e.g., a current location) to a second location (e.g., a target location). For the purpose of this discussion, a route can be a sequence of waypoints for travelling between two locations. As examples, waypoints may include streets, intersections, global positioning system (GPS) coordinates, etc. Further, the planner component 526 can generate an instruction for guiding the autonomous vehicle along at least a portion of the route from the first location to the second location. In at least one example, the planner component 526 can determine how to guide the autonomous vehicle from a first waypoint in the sequence of waypoints to a second waypoint in the sequence of waypoints. In some examples, the instruction can be a trajectory, or a portion of a trajectory.

In at least one example, the vehicle computing device(s) 504 can include one or more system controller(s) 528, which can be configured to control steering, propulsion, braking, safety, emitters, communication, components, and other systems of the vehicle 502. These system controller(s) 528 can communicate with and/or control corresponding systems of the drive system(s) 514 and/or other components of the vehicle 502.

The memory 518 can further include the map(s) component 530 to maintain and/or update one or more maps (not shown) that can be used by the vehicle 502 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment and can be loaded into working memory as needed. In at least one example, the one or more maps can include at least one map (e.g., images and/or a mesh). In some examples, the vehicle 502 can be controlled based at least in part on the maps. That is, the maps can be used in connection with the localization component 520, the perception component 522, and/or the planner component 526 to determine a location of the vehicle 502, identify objects in an environment, and/or generate routes and/or trajectories to navigate within an environment.

The memory 518 also includes the trajectory validation component 532. The trajectory validation component 532 may be associated with the low-level system 122 described herein. In some examples, the trajectory validation component 532 may receive output occupancy maps from the machine-learned model(s) 128 and determine whether a planned trajectory of the vehicle is safe. For instance, the trajectory validation component 532 may receive an occupancy map from the machine-learned model(s) 128 and determine that the planned trajectory results in an adverse event, and then notify the planner component 526 to alter the trajectory.

In some instances, aspects of some or all of the memory-stored components discussed herein can include any models, algorithms, and/or machine learning algorithms. For example, in some instances, components in the memory 518 (and the memory 546, discussed in further detail below) such as the localization component 520, the perception component 522, the prediction component 524, the planner component 526, etc. can be implemented as a neural network. As described herein, an exemplary neural network is a biologically inspired algorithm which passes input data through a series of connected layers to produce an output. Each layer in a neural network can also comprise another neural network or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 9 (ID9), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

In at least one example, the sensor system(s) 506 can include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), image sensors (e.g., camera, RGB, IR, intensity, depth, etc.), audio sensors (e.g., microphones), wheel encoders, environment sensors (e.g., temperature sensors, humidity sensors, light sensors, pressure sensors, etc.), temperature sensors (e.g., for measuring temperatures of vehicle components), etc. The sensor system(s) 506 can include multiple instances of each of these or other types of sensors. For instance, the lidar sensors can include individual lidar sensors located at the corners, front, back, sides, and/or top of the vehicle 502. As another example, the image sensors can include multiple image sensors disposed at various locations about the exterior and/or interior of the vehicle 502. As an even further example, the audio sensors can include multiple audio sensors disposed at various locations about the exterior and/or interior of the vehicle 502. Additionally, the audio sensors can include an array of a plurality of audio sensors for determining directionality of audio data. The sensor system(s) 506 can provide input to the vehicle computing device(s) 504. Additionally, or alternatively, the sensor system(s) 506 can send sensor data, via the one or more networks 158, to the one or more computing device(s) 542 at a particular frequency, after a lapse of a predetermined period of time, in near real-time, etc.

The vehicle 502 can also include one or more emitters 508 for emitting light and/or sound. The emitters 508 in this example include interior audio and visual emitters to communicate with passengers of the vehicle 502. By way of example, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 508 in this example also include exterior emitters. By way of example, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 502 can also include one or more communication connection(s) 510 that enable communication between the vehicle 502 and one or more other local or remote computing device(s). For instance, the communication connection(s) 510 can facilitate communication with other local computing device(s) on the vehicle 502 and/or the drive system(s) 514. Also, the communication connection(s) 510 can allow the vehicle 502 to communicate with other nearby computing device(s) (e.g., other nearby vehicles, traffic signals, etc.). The communications connection(s) 510 also enable the vehicle 502 to communicate with the remote teleoperations system 148 or other remote services.

The communications connection(s) 510 can include physical and/or logical interfaces for connecting the vehicle computing device(s) 504 to another computing device (e.g., computing device(s) 542) and/or a network, such as network (s) 540. For example, the communications connection(s) 510 can enable Wi-Fi-based communication such as via frequencies defined by the IEEE 702.11 standards, short range wireless frequencies such as Bluetooth®, cellular communication (e.g., 2G, 9G, 4G, 4G LTE, 5G, etc.) or any suitable wired or wireless communications protocol that enables the respective computing device to interface with the other computing device(s).

In at least one example, the direct connection 512 of vehicle 502 can provide a physical interface to couple the one or more drive system(s) 514 with the body of the vehicle 502. For example, the direct connection 512 can allow the transfer of energy, fluids, air, data, etc. between the drive system(s) 514 and the vehicle 502. In some instances, the direct connection 512 can further releasably secure the drive system(s) 514 to the body of the vehicle 502.

In at least one example, the vehicle 502 can include one or more drive assemblies 514. In some examples, the vehicle 502 can have a single drive assembly 514. In at least one example, if the vehicle 502 has multiple drive assemblies 514, individual drive assemblies 514 can be positioned on opposite longitudinal ends of the vehicle 502 (e.g., the leading and trailing ends, the front and the rear, etc.).

The drive system(s) 514 can include many of the vehicle systems and/or components, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 514 can include a drive assembly controller which can receive and preprocess data from the sensor system(s) and to control operation of the various vehicle systems. In some examples, the drive assembly controller can include one or more processors and memory communicatively coupled with the one or more processors. The memory can store one or more systems to perform various functionalities of the drive system(s) 514. Furthermore, the drive system(s) 514 may also include one or more communication connection(s) that enable communication by the respective drive assembly with one or more other local or remote computing device(s).

The computing device(s) 542 can include one or more processors 544 and memory 546 that may be communicatively coupled to the one or more processors 544. The memory 546 may store the trajectory validation component 532, a training component 548, and log data 550. In some examples, the computing device(s) 542 may be associated with a teleoperations system.

In some examples, the training component 548 may access log data 550 associated with the vehicle 502 and use the log data 550 to train the machine-learned model(s) 128 of the trajectory validation component 532. In some examples, the log data 550 may include logs of outputs from the perception component 522, which may include 3D bounding boxes associated with objects in an environment surrounding the vehicle 502.

The processor(s) 516 of the vehicle 502 and the processor (s) 544 of the computing device(s) 542 can be any suitable processor capable of executing instructions to process data and perform operations as described herein. By way of example and not limitation, the processor(s) 516 and 544 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 518 and 546 are examples of non-transitory computer-readable media. The memory 518 and 546 can store an operating system and one or more software applications, instructions, programs, and/or data to implement the methods described herein and the functions attributed to the various systems. In various implementations, the memory can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

As can be understood, the components discussed herein are described as divided for illustrative purposes. However, the operations performed by the various components can be combined or performed in any other component. It should be noted that while FIG. 5 is illustrated as a distributed system, in alternative examples, components of the vehicle 502 can be associated with the computing device(s) 542 and/or components of the computing device(s) 542 can be associated with the vehicle 502. That is, the vehicle 502 can perform one or more of the functions associated with the computing device(s) 542, and vice versa.

Example Clauses

A. A vehicle comprising: a primary perception system; and a secondary perception system, the secondary perception system configured to perform operations comprising: receiving sensor data generated by different sensor modalities of the vehicle, the sensor data including at least radar data generated by a radar sensor and lidar data generated by a lidar sensor; inputting the sensor data into a machine-learned model; receiving, from the machine-learned model, an occupancy grid associated with an environment in proximity to the vehicle; and determining a corrective action for the vehicle based on the occupancy grid, wherein the corrective action is different than an action determined for the vehicle based on an output from the primary perception system.

B. The vehicle as recited in paragraph A, the operations further comprising: determining a radar feature map based on the radar data, wherein radar features included in the radar feature map are indicative of locations of objects in the environment surrounding the vehicle; and determining a lidar feature map based on the lidar data, wherein lidar features included in the lidar feature map are indicative of elevation measurements associated with at least one of the radar features or the objects; wherein inputting the sensor data into the machine-learned model comprises inputting the radar feature map and the lidar feature map into the machine-learned model.

C. The vehicle as recited in any one of paragraphs A-B, wherein the occupancy grid includes at least a first representation of a non-drivable object in the environment and excludes a second representation of at least one of an over-drivable object or an under-drivable object in the environment.

D. The vehicle as recited in any one of paragraphs A-C, wherein the occupancy grid is a first occupancy grid of a series of occupancy grids, the first occupancy grid corresponding with a present time and a second occupancy grid of the series of occupancy grids corresponding with a future time.

E. A method comprising: inputting, by a secondary perception system associated with a vehicle, radar data and lidar data into a machine-learned model; receiving, from the machine-learned model, an occupancy grid associated with an environment in proximity to the vehicle; and determining, by the secondary perception system and based at least in part on the occupancy grid, whether to perform a corrective action for the vehicle.

F. The method as recited in paragraph E, wherein the corrective action is different than an action determined for the vehicle based on an output from a primary perception system of the vehicle.

G. The method as recited in any one of paragraphs E-F, wherein the corrective action comprises altering a planned trajectory of the vehicle, the planned trajectory determined by a planner component of the vehicle based on an output from a primary perception system of the vehicle.

H. The method as recited in any one of paragraphs E-G, further comprising: determining, by the secondary perception system, a radar feature map based on the radar data, wherein radar features included in the radar feature map are indicative of locations of objects in the environment surrounding the vehicle; and determining, by the secondary perception system, a lidar feature map based on the lidar data, wherein lidar features included in the lidar feature map are indicative of elevation measurements associated with at least one of the radar features or the objects; wherein inputting the radar data and the lidar data into the machine-learned model comprises inputting the radar feature map and the lidar feature map into the machine-learned model.

I. The method as recited in any one of paragraphs E-H, wherein: the radar feature map includes a first point cloud of features corresponding with the object at the location, and the lidar feature map includes a second point cloud of features that are indicative of the elevation information corresponding with the first point cloud of features.

J. The method as recited in any one of paragraphs E-I, wherein the machine-learned model is configured to: determine a location of an object in the environment based at least in part on the radar data; determine an elevation of the object at the location based at least in part on the lidar data; and determine whether the object is at least one of an over-drivable object, an under drivable object, or a non-drivable object based at least in part on the location and the elevation of the object.

K. The method as recited in any one of paragraphs E-J, wherein the occupancy grid is a first occupancy grid of a series of occupancy grids output by the machine-learned model, the first occupancy grid corresponding with a present time and a second occupancy grid of the series of occupancy grids corresponding with a future time.

L. The method as recited in any one of paragraphs E-K, wherein inputting the radar data and lidar data into the machine learned model comprises inputting a series of frames of radar data and lidar data into the machine-learned model, each frame of the series of frames being associated with a different point in time.

M. One or more non-transitory computer-readable media storing instructions that, when executed, cause one or more processors associated with a secondary perception system of a vehicle to perform operations comprising: inputting radar data and lidar data into a machine-learned model; receiving, from the machine-learned model, an occupancy grid associated with an environment in proximity to the vehicle; and determining, based at least in part on the occupancy grid, whether to perform a corrective action for the vehicle.

N. The one or more non-transitory computer-readable media as recited in paragraph M, wherein the corrective action is different than an action determined for the vehicle based on an output from a primary perception system of the vehicle.

O. The one or more non-transitory computer-readable media as recited in any one of paragraphs M-N, wherein the corrective action comprises altering a planned trajectory of the vehicle, the planned trajectory determined by a planner component of the vehicle based on an output from a primary perception system of the vehicle.

P. The one or more non-transitory computer-readable media as recited in any one of paragraphs M-O, the operations further comprising: determining a radar feature map based on the radar data, wherein radar features included in the radar feature map are indicative of locations of objects in the environment surrounding the vehicle; and determining a lidar feature map based on the lidar data, wherein lidar features included in the lidar feature map are indicative of elevation measurements associated with at least one of the radar features or the objects; wherein inputting the radar data and the lidar data into the machine-learned model comprises inputting the radar feature map and the lidar feature map into the machine-learned model.

Q. The one or more non-transitory computer-readable media as recited in any one of paragraphs M-P, wherein: the radar feature map includes a first point cloud of features corresponding with the object at the location, and the lidar feature map includes a second point cloud of features that are indicative of the elevation information corresponding with the first point cloud of features.

R. The one or more non-transitory computer-readable media as recited in any one of paragraphs M-Q, wherein the machine-learned model is configured to: determine a location of an object in the environment based at least in part on the radar data; determine an elevation of the object at the location based at least in part on the lidar data; and determine whether the object is at least one of an over-drivable object, an under drivable object, or a non-drivable object based at least in part on the location and the elevation of the object.

S. The one or more non-transitory computer-readable media as recited in any one of paragraphs M-R, wherein the occupancy grid is a first occupancy grid of a series of occupancy grids output by the machine-learned model, the first occupancy grid corresponding with a present time and a second occupancy grid of the series of occupancy grids corresponding with a future time.

T. The one or more non-transitory computer-readable media as recited in any one of paragraphs M-S, wherein inputting the radar data and lidar data into the machine learned model comprises inputting a series of frames of radar data and lidar data into the machine-learned model, each frame of the series of frames being associated with a different point in time.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

CONCLUSION

Although the discussion above sets forth example implementations of the described techniques, other architectures may be used to implement the described functionality and are intended to be within the scope of this disclosure. Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A vehicle comprising:
   a primary computing system comprising first hardware directed to a first task; and
   a secondary computing system, the secondary computing system comprising second hardware directed to a second task, the secondary computing system configured to perform operations comprising:
      receiving sensor data generated by different sensor modalities of the vehicle, the sensor data including at least radar data generated by a radar sensor and lidar data generated by a lidar sensor;
      inputting the sensor data into a machine-learned model;
      receiving, from the machine-learned model, an occupancy grid associated with an environment in proximity to the vehicle;
      determining a corrective action for the vehicle based on the occupancy grid, wherein the corrective action is different than an action determined for the vehicle based on an output from the primary computing system and the corrective action comprises altering a planned trajectory of the vehicle, the planned trajectory determined by a planner component of the vehicle based on the output from the primary computing system of the vehicle; and
      controlling, based at least in part on the corrective action, the vehicle.

2. The vehicle of claim 1, the operations further comprising:
   determining a radar feature map based on the radar data, wherein radar features included in the radar feature map are indicative of locations of objects in the environment surrounding the vehicle; and
   determining a lidar feature map based on the lidar data, wherein lidar features included in the lidar feature map are indicative of elevation measurements associated with at least one of the radar features or the objects;
   wherein inputting the sensor data into the machine-learned model comprises inputting the radar feature map and the lidar feature map into the machine-learned model.

3. The vehicle of claim 1, wherein the occupancy grid includes at least a first representation of a non-drivable object in the environment and excludes a second representation of at least one of an over-drivable object or an under-drivable object in the environment.

4. The vehicle of claim 1, wherein the occupancy grid is a first occupancy grid of a series of occupancy grids, the first occupancy grid corresponding with a present time and a second occupancy grid of the series of occupancy grids corresponding with a future time.

5. A method comprising:
   inputting, by a secondary computing system comprising second hardware directed to a second task associated with a vehicle, radar data and lidar data into a machine-learned model;
   receiving, from the machine-learned model, an occupancy grid associated with an environment in proximity to the vehicle;
   determining, by the secondary computing system and based at least in part on the occupancy grid, whether to perform a corrective action for the vehicle, wherein the corrective action comprises altering a planned trajectory of the vehicle, the planned trajectory determined by a planner component associated with the vehicle based on an output from a primary computing system comprising first hardware directed to a first task associated with the vehicle; and
   controlling, based at least in part on the corrective action, the vehicle.

6. The method of claim 5, wherein the corrective action is different than an action determined for the vehicle based on the output from the primary computing system of the vehicle.

7. The method of claim 5, further comprising:
   determining, by the secondary computing system, a radar feature map based on the radar data, wherein radar features included in the radar feature map are indicative of locations of objects in the environment surrounding the vehicle; and
   determining, by the secondary computing system, a lidar feature map based on the lidar data, wherein lidar features included in the lidar feature map are indicative of elevation measurements associated with at least one of the radar features or the objects;
   wherein inputting the radar data and the lidar data into the machine-learned model comprises inputting the radar feature map and the lidar feature map into the machine-learned model.

8. The method of claim 7, wherein:
   the radar feature map includes a first point cloud of features corresponding with an object at the location, and
   the lidar feature map includes a second point cloud of features that are indicative of elevation information corresponding with the first point cloud of features.

9. The method of claim 5, wherein the machine-learned model is configured to:
   determine a location of an object in the environment based at least in part on the radar data;
   determine an elevation of the object at the location based at least in part on the lidar data; and
   determine whether the object is at least one of an over-drivable object, an under-drivable object, or a non-drivable object based at least in part on the location and the elevation of the object.

10. The method of claim 5, wherein the occupancy grid is a first occupancy grid of a series of occupancy grids output by the machine-learned model, the first occupancy grid corresponding with a present time and a second occupancy grid of the series of occupancy grids corresponding with a future time.

11. The method of claim 5, wherein inputting the radar data and lidar data into the machine-learned model comprises inputting a series of frames of radar data and lidar data into the machine-learned model, each frame of the series of frames being associated with a different point in time.

12. One or more non-transitory computer-readable media storing instructions that, when executed, cause one or more processors associated with a secondary computing system comprising second hardware directed to a second task of a vehicle to perform operations comprising:

inputting radar data and lidar data into a machine-learned model;

receiving, from the machine-learned model, an occupancy grid associated with an environment in proximity to the vehicle;

determining, based at least in part on the occupancy grid, whether to perform a corrective action for the vehicle, wherein the corrective action comprises altering a planned trajectory of the vehicle, the planned trajectory determined by a planner component associated with the vehicle based on an output from a primary computing system comprising first hardware directed to a first task associated with the vehicle; and controlling, based at least in part on the corrective action, the vehicle.

13. The one or more non-transitory computer-readable media of claim 12, wherein the corrective action is different than an action determined for the vehicle based on the output from the primary computing system of the vehicle.

14. The one or more non-transitory computer-readable media of claim 12, the operations further comprising:

determining a radar feature map based on the radar data, wherein radar features included in the radar feature map are indicative of locations of objects in the environment surrounding the vehicle; and determining a lidar feature map based on the lidar data, wherein lidar features included in the lidar feature map are indicative of elevation measurements associated with at least one of the radar features or the objects;

wherein inputting the radar data and the lidar data into the machine-learned model comprises inputting the radar feature map and the lidar feature map into the machine-learned model.

15. The one or more non-transitory computer-readable media of claim 14, wherein:

the radar feature map includes a first point cloud of features corresponding with the object at the location, and the lidar feature map includes a second point cloud of features that are indicative of the elevation measurements corresponding with the first point cloud of features.

16. The one or more non-transitory computer-readable media of claim 12, wherein the machine-learned model is configured to:

determine a location of an object in the environment based at least in part on the radar data;

determine an elevation of the object at the location based at least in part on the lidar data; and determine whether the object is at least one of an over-drivable object, an under-drivable object, or a non-drivable object based at least in part on the location and the elevation of the object.

17. The one or more non-transitory computer-readable media of claim 12, wherein the occupancy grid is a first occupancy grid of a series of occupancy grids output by the machine-learned model, the first occupancy grid corresponding with a present time and a second occupancy grid of the series of occupancy grids corresponding with a future time.

18. The one or more non-transitory computer-readable media of claim 12, wherein inputting the radar data and lidar data into the machine-learned model comprises inputting a series of frames of radar data and lidar data into the machine-learned model, each frame of the series of frames being associated with a different point in time.

* * * * *